US011629765B2

United States Patent
Jenkinson et al.

(10) Patent No.: US 11,629,765 B2
(45) Date of Patent: Apr. 18, 2023

(54) BRAKE ROTOR

(71) Applicant: ArvinMeritor Technology, LLC, Troy, MI (US)

(72) Inventors: Scott Jenkinson, Davisburg, MI (US); Subrahmanya Cholachagudda, Bangalore (IN)

(73) Assignee: ArvinMeritor Technology, LLC, Troy, MI (US)

( * ) Notice: Subject to any disclaimer, the term of this patent is extended or adjusted under 35 U.S.C. 154(b) by 64 days.

(21) Appl. No.: 17/231,733

(22) Filed: Apr. 15, 2021

(65) Prior Publication Data
US 2021/0356007 A1   Nov. 18, 2021

(30) Foreign Application Priority Data

May 15, 2020 (IN) .............................. 202011020549

(51) Int. Cl.
*F16D 65/12* (2006.01)
*F16D 65/02* (2006.01)

(52) U.S. Cl.
CPC .... *F16D 65/123* (2013.01); *F16D 2065/1328* (2013.01); *F16D 2065/1392* (2013.01)

(58) Field of Classification Search
CPC ........... F16D 65/12; F16D 65/123–128; F16D 2065/1328; F16D 2065/1392
USPC ......................................... 188/18 A, 218 XL
See application file for complete search history.

(56) References Cited

U.S. PATENT DOCUMENTS

| | | | |
|---|---|---|---|
| 4,501,346 A | * | 2/1985 | Bogenschutz ........ F16D 65/123 188/218 XL |
| 7,934,586 B1 | | 5/2011 | Black |
| 8,418,817 B2 | | 4/2013 | Visca et al. |
| 9,303,705 B2 | | 4/2016 | Plantan et al. |
| 10,011,180 B2 | | 6/2018 | Melekian et al. |
| 2004/0074717 A1 | | 4/2004 | Conti |
| 2004/0084261 A1 | * | 5/2004 | Burgoon ............. F16D 65/0006 188/218 XL |
| 2005/0269174 A1 | * | 12/2005 | Lin ........................ F16D 65/12 188/218 XL |
| 2009/0057077 A1 | * | 3/2009 | Mears ................... F16D 65/128 188/218 XL |
| 2016/0025166 A1 | | 1/2016 | Plantan et al. |
| 2017/0074335 A1 | | 3/2017 | Wagner |

(Continued)

FOREIGN PATENT DOCUMENTS

| | | |
|---|---|---|
| CN | 204200918 U | 3/2015 |
| CN | 107428199 A | 12/2017 |
| EP | 1375953 A2 | 1/2004 |

(Continued)

OTHER PUBLICATIONS

India First Examination Report dated Dec. 22, 2021 for related India Application No. 202011020549; 6 pgs.

(Continued)

*Primary Examiner* — Christopher P Schwartz
(74) *Attorney, Agent, or Firm* — Brooks Kushman PC

(57) ABSTRACT

A brake rotor having first and second panels and first and second sets of mounting flanges. The first set of mounting flanges may extend from the first panel and may be spaced apart from the second panel. The second set of mounting flanges may extend from the second panel and may be spaced apart from the first set of mounting flanges.

20 Claims, 7 Drawing Sheets

(56) References Cited

U.S. PATENT DOCUMENTS

2019/0353207 A1  11/2019  Gonska

FOREIGN PATENT DOCUMENTS

| EP | 1382878 | A2 * | 1/2004 | ........... F16D 65/123 |
| EP | 2604883 | A2 | 6/2013 | |

OTHER PUBLICATIONS

Extended European Search Report dated Sep. 23, 2021 for related European Application No. 21173052.8; 7 pgs.
Chinese First Office Action dated Dec. 8, 2022 for related Chinese Application No. 202110526513.6; 9 pgs.

* cited by examiner

BRAKE ROTOR

TECHNICAL FIELD

This document relates to a brake rotor.

BACKGROUND

A brake rotor is disclosed in U.S. Pat. No. 10,011,180.

SUMMARY

In at least one embodiment, a brake rotor is provided. The brake rotor may include a first panel, a second panel, a first set of mounting flanges, and a second set of mounting flanges. The first and second panels may extend around an axis and may cooperate to at least partially define a rotor opening. The first panel may be spaced apart from the second panel. The first set of mounting flanges may extend from the first panel into the rotor opening and may be spaced apart from the second panel. The second set of mounting flanges may extend from the second panel into the rotor opening and may be spaced apart from the first set of mounting flanges.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
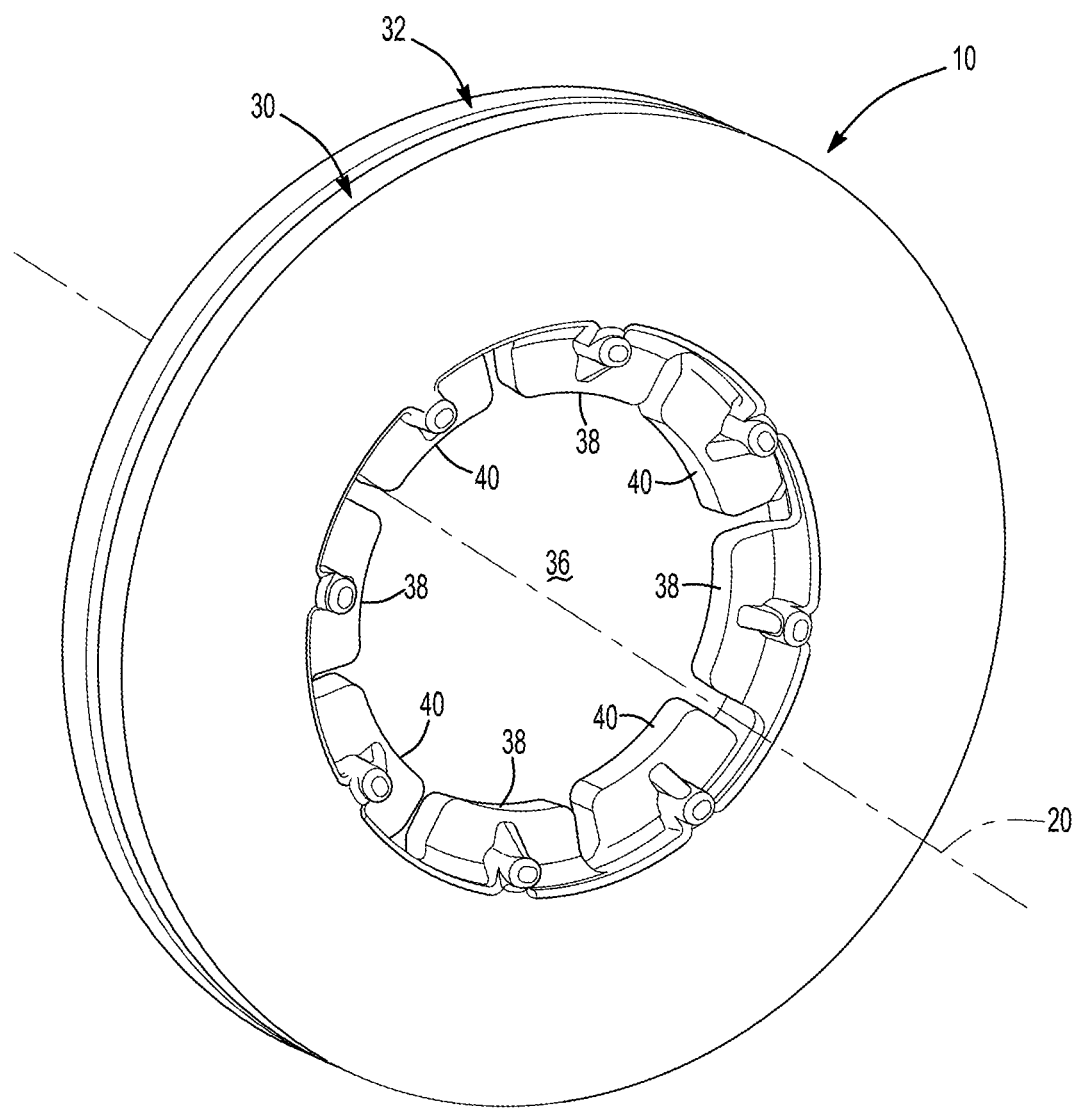
FIG. 1 is a perspective view of an example of a brake rotor prior to finishing operations.
Figure 2:
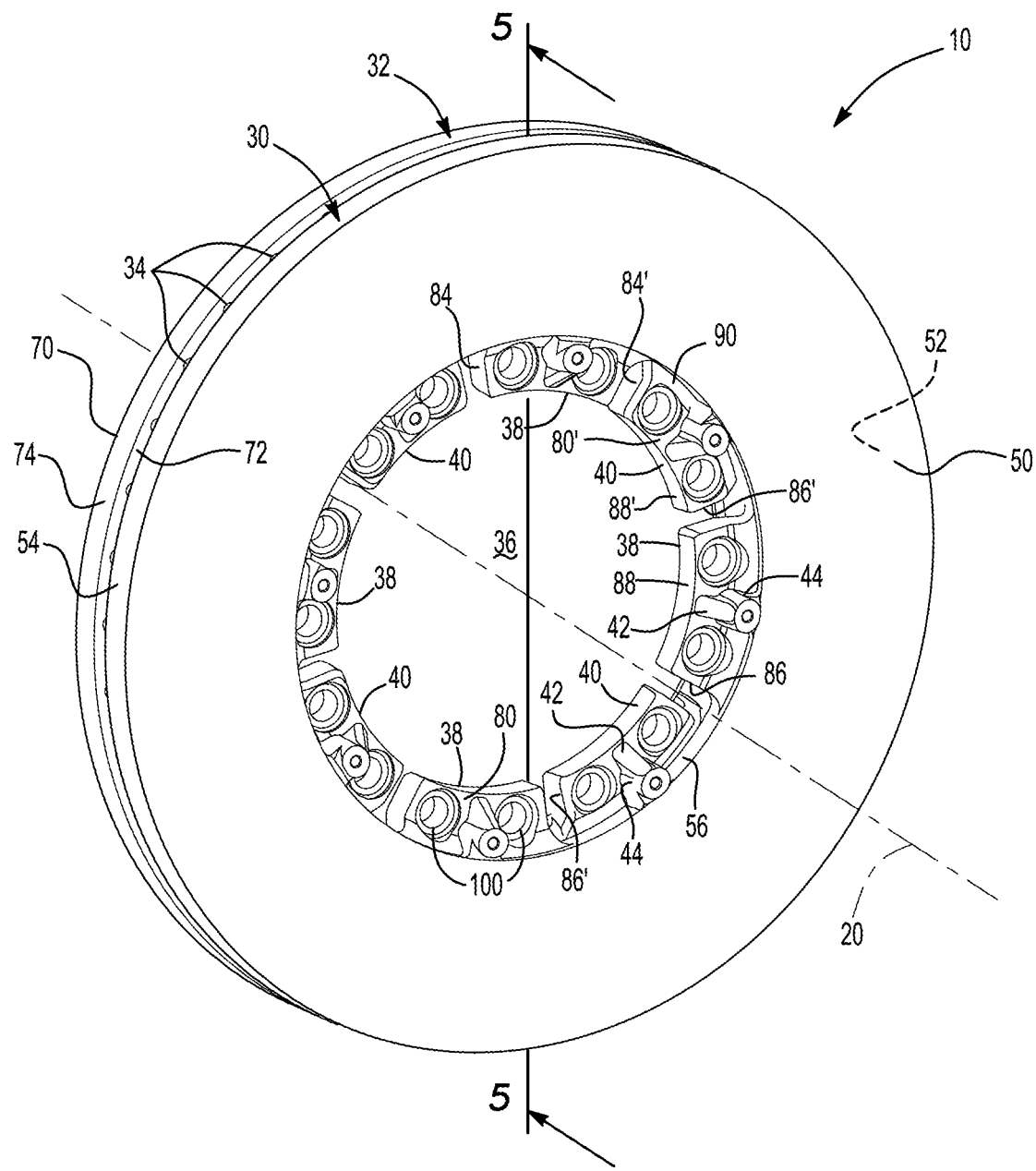
FIGS. 2 and 3 are perspective views of an example of a brake rotor.
Figure 3:
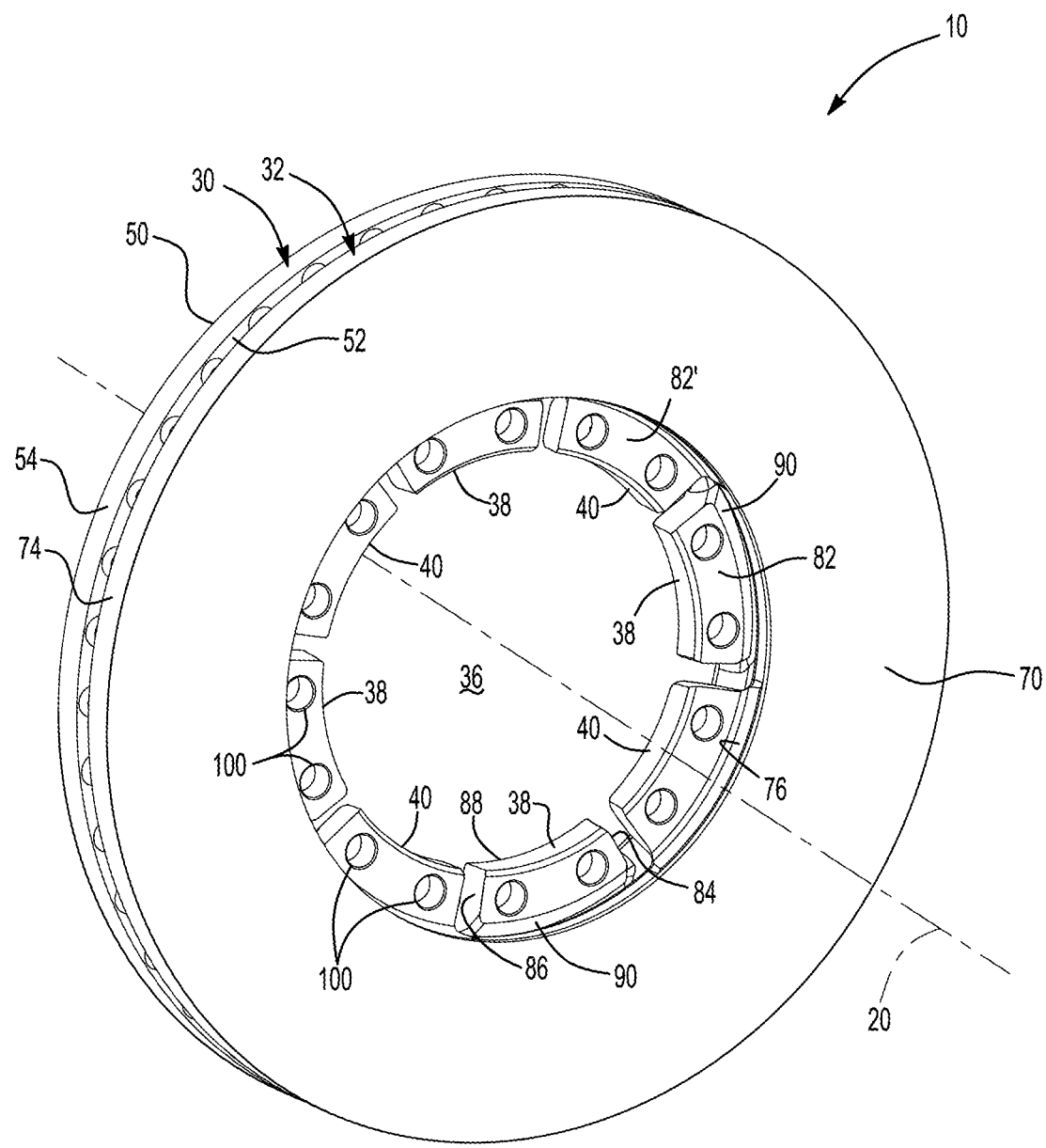

Referring to FIGS. 1-3, an example of a brake rotor 10 is shown. The brake rotor 10 is shown in a partially manufactured state in FIG. 1, such as prior to material removal or finishing operations, and is shown after such operations in FIGS. 2 and 3. The brake rotor 10 may be a one-piece cast metal component.

The brake rotor 10 may be provided with a motor vehicle like a truck, bus, farm equipment, military transport or weaponry vehicle, or cargo loading equipment for land, air, or marine vessels or a trailer that may be provided with a motor vehicle. More specifically, the brake rotor 10 may be part of a disc brake that may facilitate braking of a vehicle wheel. The brake rotor 10 may be fixedly mountable to a wheel hub that may support the vehicle wheel. The brake rotor 10 may be rotatable about an axis 20 with the wheel hub and the vehicle wheel and may provide friction surfaces that facilitate braking. In at least one configuration, the brake rotor 10 may include a first panel 30, a second panel 32, a set of vanes 34. a rotor opening 36, the first set of mounting flanges 38, and a second set of mounting flanges 40. Optionally, the brake rotor 10 may include one or more reinforcement features 42 and one or more tone ring mounts 44.

Figure 4:
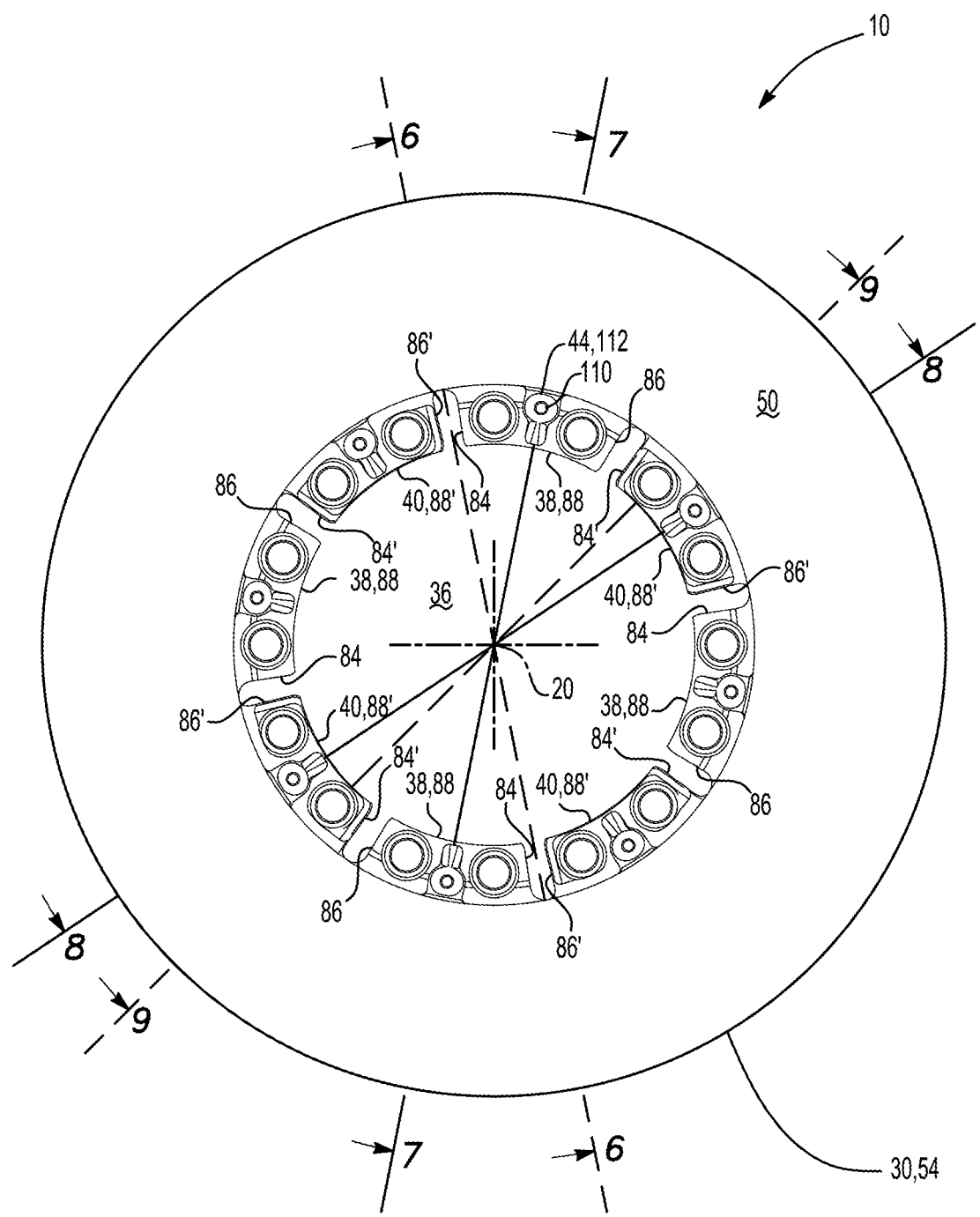
FIG. 4 is a side view of the brake rotor of FIGS. 2 and 3.

Referring primarily to FIGS. 2-4, the first panel 30 may be configured as a ring that may extend around the axis 20. In at least one configuration, the first panel 30 may have a first friction surface 50, a first interior surface 52, an outer side 54, and an inner side 56.

The first friction surface 50 may be engaged by friction material of a first brake pad to slow rotation of the brake rotor 10 and an associated wheel about the axis 20. The first friction surface 50 may be substantially planar. In addition, the first friction surface 50 may be disposed substantially perpendicular to the axis 20.

The first interior surface 52 may be disposed opposite the first friction surface 50. The first interior surface 52 may face toward the second panel 32 and may be spaced apart from the second panel 32. The first interior surface 52 may be disposed substantially parallel to the first friction surface 50.

The outer side 54 may face away from the axis 20. In at least one configuration, the outer side 54 may extend from the first friction surface 50 to the first interior surface 52 and may define an outside circumference of the first panel 30. Accordingly, the outer side 54 may extend continuously around the axis 20 and be disposed at a substantially constant radial distance from the axis 20 in one or more configurations.

The inner side 56 may be disposed opposite the outer side 54. As such, the inner side 56 may face toward the axis 20 and may be disposed closer to the axis 20 and the outer side 54. In at least one configuration, the inner side 56 or a portion thereof may extend from the first friction surface 50 to the first interior surface 52. The inner side 56 may be disposed substantially parallel to the outer side 54 and may be disposed at a substantially constant radial distance from the axis 20 in one or more configurations.

Figure 6:
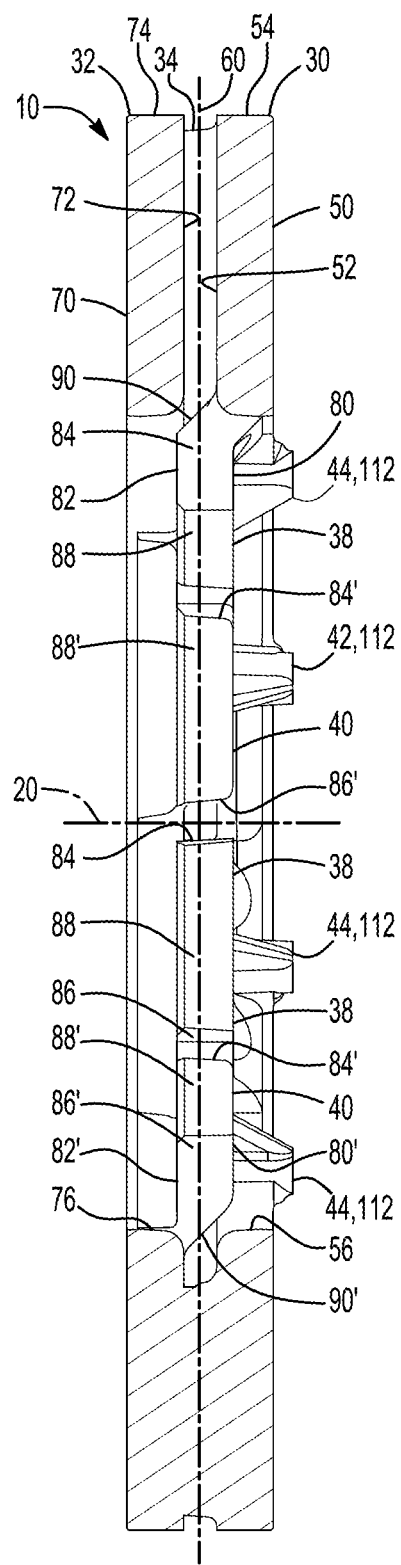
FIG. 6 is a section view of the brake rotor along section line 6-6.

The second panel 32 may be spaced apart from the first panel 30. The first panel 30 and the second panel 32 may have substantially similar configurations. For instance, the first panel 30 and the second panel 32 may have mirror symmetry with respect to a center plane 60, which is best shown in FIG. 6, that may be disposed substantially perpendicular to the axis 20 and that may be disposed between the first panel 30 and the second panel 32. The center plane 60 may bisect the brake rotor 10 or may be bisect the gap between the first panel 30 and the second panel 32. Accordingly, the second panel 32 may be configured as a ring that may extend around the axis 20 and may have a second friction surface 70, a second interior surface 72, an outer side 74, and an inner side 76.

The second friction surface 70 may be engaged by friction material of second brake pad to slow rotation of the brake rotor 10 and an associated wheel about the axis 20. The second friction surface 70 may face away from the first friction surface 50 and may be substantially planar. In addition, the second friction surface 70 may be disposed substantially perpendicular to the axis 20 and may be disposed substantially parallel to the first friction surface 50.

The second interior surface 72 may be disposed opposite the second friction surface 70. The second interior surface 72 may face toward the first interior surface 52 of the first panel 30 and may be spaced apart from the first panel 30. The second interior surface 72 may be disposed substantially parallel to the second friction surface 70.

The outer side 74 may face away from the axis 20. In at least one configuration, the outer side 74 may extend from the second friction surface 70 to the second interior surface 72 and may define an outside circumference of the second panel 32. Accordingly, the outer side 74 may extend continuously around the axis 20 and may be disposed at a substantially constant radial distance from the axis 20 and one or more configurations.

The inner side 76 may be disposed opposite the outer side 74 of the second panel 32. As such, the inner side 76 may face toward the axis 20 and may be disposed closer to the axis 20 and the outer side 74. In at least one configuration, the inner side 76 or a portion thereof may extend from the second friction surface 70 to the second interior surface 72. The inner side 76 may be disposed substantially parallel to the outer side 74 and may be disposed at a substantially constant radial distance from the axis 20 in one or more configurations.

Figure 5:
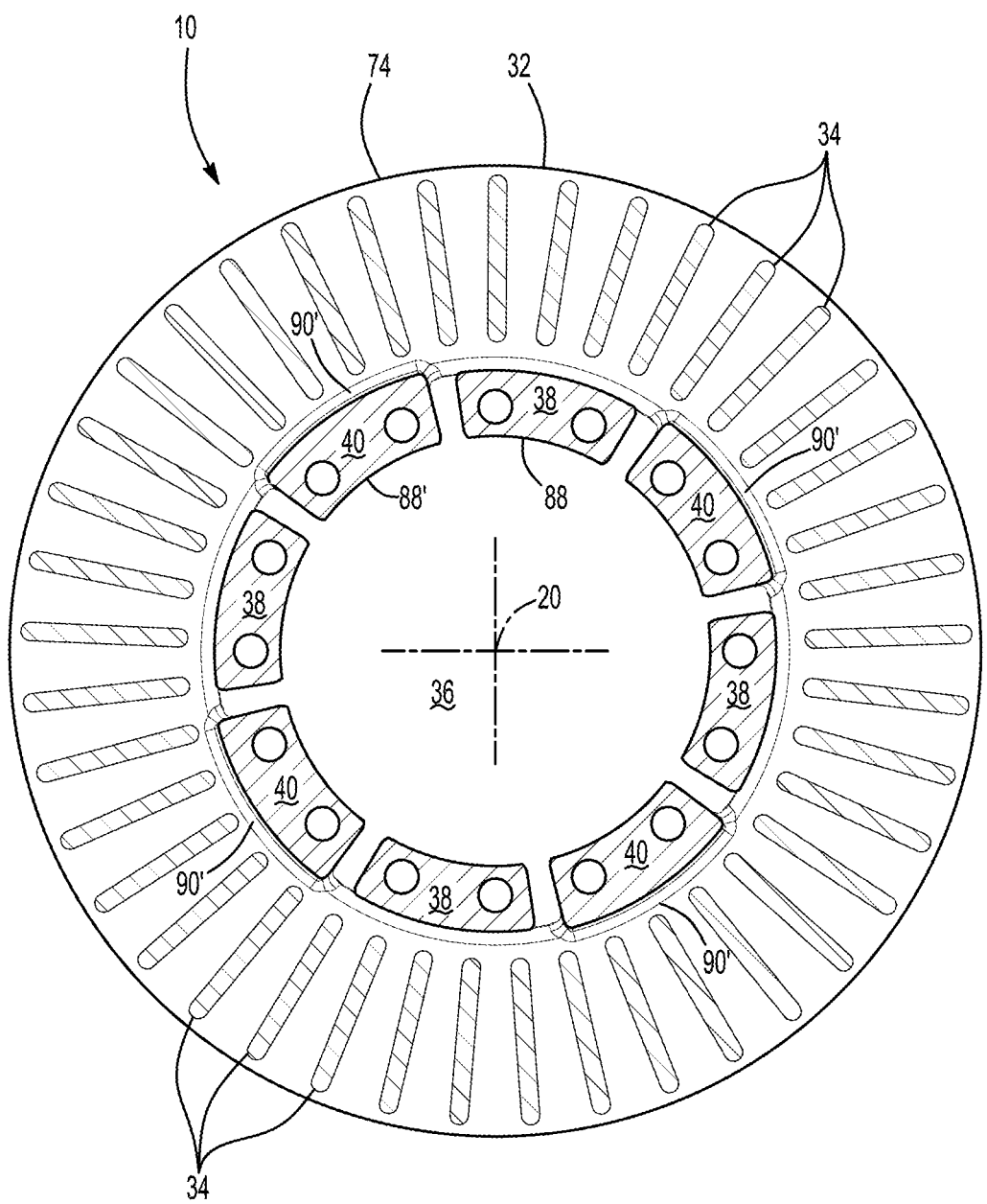
FIG. 5 is a section view of the brake rotor along section line 5-5.

Referring to FIGS. 2, 5 and 6, the set of vanes 34 may extend from the first panel 30 to the second panel 32. More specifically, the vanes 34 may extend from the first interior surface 52 of the first panel 30 to the second interior surface 72 of the second panel 32. The vanes 34 may be arranged around the axis 20 in a repeating pattern and may be spaced apart from each other. As such, the vanes 34 may interconnect the first panel 30 with the second panel 32 while providing an air gap between the first panel 30 and the second panel 32 that may facilitate cooling of the brake rotor 10. In at least one configuration, the vanes 34 may extend along radial lines that may extend from the axis 20. The vanes 34 may be positioned closer to the axis 20 than the outer sides 54, 74 of the first and second panels 30, 32, respectively, and may be positioned further from the axis 20 than the inner sides 56, 76 of the first and second panels 30, 32, respectively. In addition, the vanes 34 may be arranged around the first set of mounting flanges 38 and the second set of mounting flanges 40 such that the vanes 34 may be spaced apart from the first set of mounting flanges 38 and the second set of mounting flanges 40.

Referring primarily to FIGS. 2-4, the first panel 30 and the second panel 32 may cooperate to at least partially define a rotor opening 36. The rotor opening 36 may be a through hole that may extend through the brake rotor 10. The rotor opening 36 may be disposed proximate the center of the brake rotor 10 in may be centered about the axis 20. The rotor opening 36 may receive a portion of a wheel end assembly, such as a wheel hub. The rotor opening 36 may also receive a spindle that may support the wheel hub.

Referring primarily to FIGS. 2-6, the first set of mounting flanges 38 may be configured to facilitate positioning and mounting of the brake rotor 10. For convenience in reference, a member of the first set of mounting flanges 38 may be referred to as a first mounting flange. Each member of the first set of mounting flanges 38 may extend from the first panel 30 into the rotor opening 36. As such, each first mounting flange 38 may extend from the inner side 56 of the first panel 30 toward the axis 20. In addition, the first set of mounting flanges 38 may be spaced apart from the second panel 32. In at least one configuration, each member of the first set of mounting flanges 38 may include a first flange side 80, a second flange side 82, a first lateral flange side 84, a second lateral flange side 86, an inner flange side 88, and an outer flange side 90.

Referring to FIG. 6, the first flange side 80 may face away from the center plane 60 and the second panel 32. In at least one configuration, the first flange side 80 may be offset from the first friction surface 50 and the second friction surface 70 such that the first flange side 80 may be disposed closer to the center plane 60 than the first friction surface 50 and the second friction surface 70.

The second flange side 82 may be disposed opposite the first flange side 80. In at least one configuration, the first flange side 80 and the second flange side 82 may be disposed on opposite sides of the center plane 60. For instance, the first flange side 80 and the second flange side 82 may be disposed at substantially the same distances from the center plane 60. The second flange side 82 may be disposed substantially parallel to the first flange side 80. In addition, the second flange side 82 may be offset from the first friction surface 50 and the second friction surface 70 such that the second flange side 82 may be disposed closer to the center plane 60 than the first friction surface 50 and the second friction surface 70.

Referring primarily to FIGS. 4 and 6, the first lateral flange side 84 may extend from the first flange side 80 to the second flange side 82. The first lateral flange side 84 may also extend from the inner flange side 88 toward or to the outer flange side 90.

The second lateral flange side 86 may be disposed opposite the first lateral flange side 84. The second lateral flange side 86 may extend from the first flange side 80 to the second flange side 82. In addition, the second lateral flange side 86 may extend from the inner flange side 88 toward or to the outer flange side 90. In at least one configuration, the second lateral flange side 86 may be disposed in a nonparallel relationship with the first lateral flange side 84. The first lateral flange side 84 and the second lateral flange side 86 may be substantially planar.

The inner flange side 88 may face toward the axis 20. The inner flange side 88 may extend from the first flange side 80 to the second flange side 82. In addition, the inner flange side 88 may extend from the first lateral flange side 84 to the second lateral flange side 86. In at least one configuration, the inner flange side 88 may extend along an arc from the first lateral flange side 84 to the second lateral flange side 86. For instance, the inner flange side 88 may be disposed at a constant or substantially constant radial distance from the axis 20.

Referring primarily to FIGS. 3 and 6, the outer flange side 90 may be disposed opposite the inner flange side 88. As such, the outer flange side 90 may face away from the axis 20 and may be disposed further away from the axis 20 than the inner flange side 88. The outer flange side 90 may extend from the second flange side 82 to the first panel 30. For instance, the outer flange side 90 may extend to the first interior surface 52 of the first panel 30. In addition, the outer flange side 90 may extend from the first lateral flange side 84 to the second lateral flange side 86. In at least one configuration, the outer flange side 90 may extend from the first panel 30 and may be partially received inside a portion of the rotor opening 36 that is defined by the second panel 32. The outer flange side 90 may be disposed in a nonparallel relationship with the inner flange side 88. For instance, the outer flange side 90 may extend further away from the axis 20 in a direction that extends from the second flange side 82 toward the first flange side 80 or in a direction that extends toward the first panel 30.

Referring primarily to FIGS. 2-6, the second set of mounting flanges 40 may also be configured to facilitate positioning and mounting of the brake rotor 10. For convenience in reference, a member of the second set of mounting flanges 40 may be referred to as a second mounting flange. Each member of the second set of mounting flanges 40 may extend from the second panel 32 into the rotor opening 36. As such, each second mounting flange 40 may extend from the inner side 76 of the second panel 32 toward the axis 20. In addition, the second set of mounting flanges 40 may be spaced apart from the first panel 30, spaced apart from the first set of mounting flanges 38, or both. In at least one configuration, members of the second set of mounting flanges 40 may have a similar configuration as the members of the first set of mounting flanges 38. As such, members of the second set of mounting flanges 40 may include a first flange side 80', a second flange side 82', a first lateral flange side 84', a second lateral flange side 86', an inner flange side 88', and an outer flange side 90'.

Referring to FIG. 6, the first flange side 80' may face away from the center plane 60 and the second panel 32. In at least one configuration, the first flange side 80' may be offset from the first friction surface 50 and the second friction surface 70 such that the first flange side 80' may be disposed closer to the center plane 60 than the first friction surface 50 and the second friction surface 70. The first flange side 80' may be coplanar with the first flange side 80.

The second flange side 82' may be disposed opposite the first flange side 80'. In at least one configuration, the first flange side 80' and the second flange side 82' may be disposed on opposite sides of the center plane 60. For instance, the first flange side 80' and the second flange side 82' may be disposed at substantially the same distances from the center plane 60. The second flange side 82' may be disposed substantially parallel to the first flange side 80'. In addition, the second flange side 82' may be offset from the first friction surface 50 and the second friction surface 70 such that the second flange side 82' may be disposed closer to the center plane 60 than the first friction surface 50 and the second friction surface 70. The second flange side 82 may be coplanar with the second flange side 82'.

Referring primarily to FIGS. 4 and 6, the first lateral flange side 84' may extend from the first flange side 80' to the second flange side 82'. The first lateral flange side 84' may also extend from the inner flange side 88' toward or to the outer flange side 90'.

The second lateral flange side 86' may be disposed opposite the first lateral flange side 84'. The second lateral flange side 86' may extend from the first flange side 80' to the second flange side 82'. In addition, the second lateral flange side 86' may extend from the inner flange side 88' toward or to the outer flange side 90'. In at least one configuration, the second lateral flange side 86' may be disposed in a nonparallel relationship with the first lateral flange side 84'. The first lateral flange side 84' and the second lateral flange side 86' may be substantially planar.

The inner flange side 88' may face toward the axis 20. The inner flange side 88' may extend from the first flange side 80' to the second flange side 82'. In addition, the inner flange side 88' may extend from the first lateral flange side 84' to the second lateral flange side 86'. In at least one configuration, the inner flange side 88' may extend along an arc from the first lateral flange side 84' to the second lateral flange side 86'. For instance, the inner flange side 88' may be disposed at a constant or substantially constant radial distance from the axis 20.

Referring primarily to FIGS. 2 and 6, the outer flange side 90' may be disposed opposite the inner flange side 88'. As such, the outer flange side 90' may face away from the axis 20 and may be disposed further away from the axis 20 than the inner flange side 88'. The outer flange side 90' may extend from the first flange side 80' to the second panel 32. For instance, the outer flange side 90' may extend to the second interior surface 72 of the second panel 32. In addition, the outer flange side 90' may extend from the first lateral flange side 84' to the second lateral flange side 86'. In at least one configuration, the outer flange side 90' may extend from the second panel 32 and may be partially received inside a portion of the rotor opening 36 that is defined by the first panel 30. The outer flange side 90' may be disposed in a nonparallel relationship with the inner flange side 88'. For instance, the outer flange side 90' may extend further away from the axis 20 in a direction that extends from the first flange side 80' toward the second flange side 82' or in a direction that extends toward the second panel 32.

In at least one configuration, members of the first set of mounting flanges 38 may be spaced apart from each other and may be spaced apart from one or more members of the second set of mounting flanges 40. Similarly, members of the second set of mounting flanges 40 may be spaced apart from each other and may be spaced apart from one or more members of the first set of mounting flanges 38.

The first set of mounting flanges 38 and the second set of mounting flanges 40 may be provided in various patterns or arrangements. For example, first set of mounting flanges 38 and the second set of mounting flanges 40 may be arranged in an alternating pattern around the axis 20, an example of which is show in FIGS. 2-6. In FIGS. 2-6, each member of the first set of mounting flanges 38 may be disposed between two different members of the second set of mounting flanges 40. Similarly, each member of the second set of mounting flanges 40 may be disposed between two different members of the first set of mounting flanges 38. In such an alternating pattern, the first lateral flange side 84 of a first mounting flange 38 may face toward the first lateral flange side 84' of a second mounting flange 40 while the second lateral side 86 of a first mounting flange 38 may face toward the second lateral flange side 86' of a second mounting flange 40 as is best shown in FIG. 4.

It is also contemplated that the first set of mounting flanges 38 and the second set of mounting flanges may be provided in different arrangements. For instance, a first mounting flange 38 may be disposed adjacent to at least one other first mounting flange 38, a second mounting flange 40 may be disposed adjacent to at least one other second mounting flange 40, or combinations thereof.

Referring to FIGS. 2, 4 and 6, one or more reinforcement features 42 may optionally be provided with a mounting flange, such as a member of the first set of mounting flanges 38, a member of the second set of mounting flanges 40, or combinations thereof. In the configuration shown, one reinforcement feature 42 is provided with each member of the first set of mounting flanges 38 and with each member of the second set of mounting flanges 40.

A reinforcement feature 42 may extend from a panel, such as the first panel 30, the second panel 32, or both, to a mounting flange, such as a first mounting flange 38 or a second mounting flange 40. In the configuration shown, each reinforcement feature 42 is depicted as extending from the first panel 30; however, it is contemplated that one or more reinforcement features 42 may extend from the second panel 32. A reinforcement feature 42 that extends from the first panel 30 may be spaced apart from the second panel 32 and vice versa. The reinforcement feature 42 may be disposed in the rotor opening 36. In addition, the reinforcement feature 42 may extend from a panel toward the axis 20. For instance, the reinforcement feature 42 may extend radially or along a radial line from the first panel 30 toward the axis 20.

A reinforcement feature 42 that extends from the first panel 30 to a first mounting flange 38 or a second mounting flange 40 may be completely spaced apart from the second panel 32. Conversely, a reinforcement feature 42 that extends from the second panel 32 to a first mounting flange 38 or a second mounting flange 40 may be completely spaced apart from the first panel 30.

Figure 7:
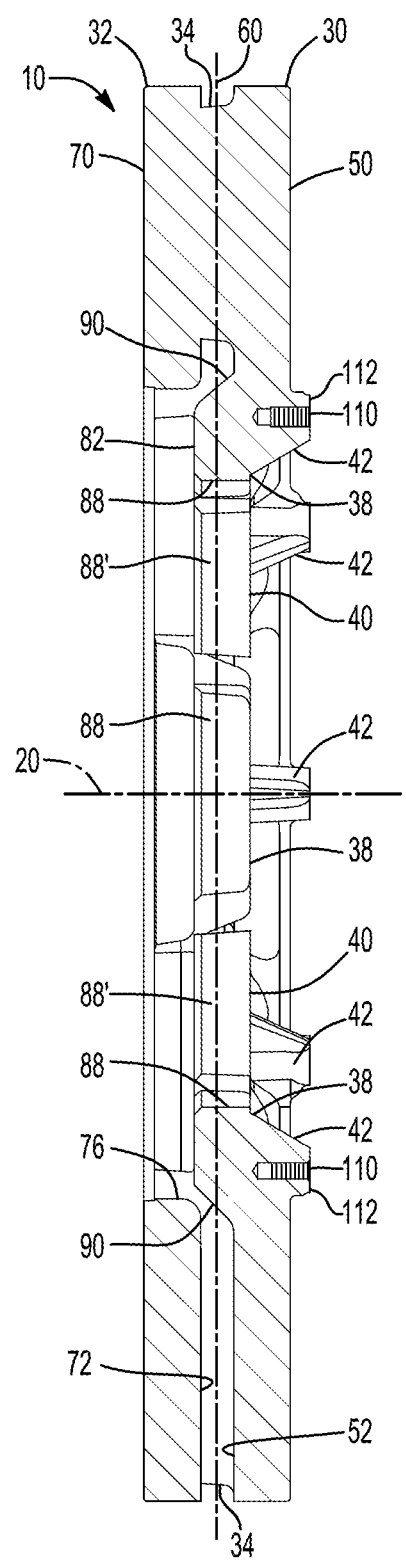
FIG. 7 is a section view of the brake rotor along section line 7-7.

Referring to FIG. 7, a section view through reinforcement features 42 provided with a pair of first mounting flanges 38 is shown. In this configuration, these reinforcement features may be completely spaced apart from the second panel 32.

Figure 8:
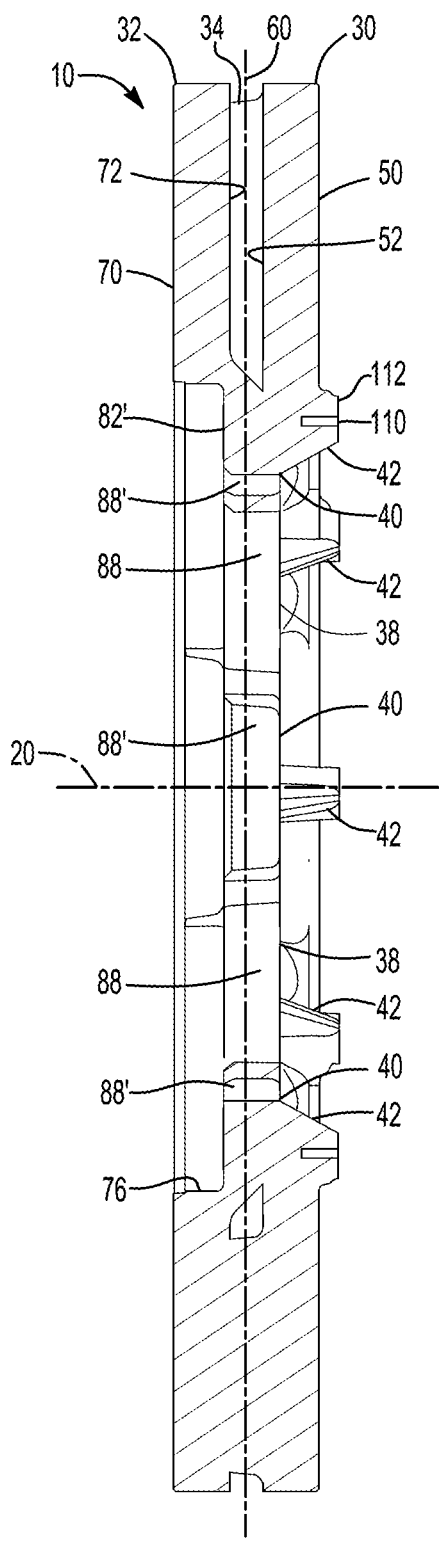
FIG. 8 is a section view of the brake rotor along section line 8-8.

Referring to FIG. 8, a section view through reinforcement features 42 provided with a pair of second mounting flanges 40 is shown. In this configuration, these reinforcement features may extend from the first panel 30 to corresponding second mounting flange 40 over a narrow localized area disposed between and spaced apart from the first lateral flange side 84' and the second lateral flange side 86'. Accordingly, the second mounting flange 40 may be completely spaced apart from the first panel 30 while a reinforcement feature 42, if provided, may extend from the first panel 30 to a second mounting flange 40. Little thermal energy may be transmitted through the reinforcement feature 42 from the first panel 30 to a corresponding second mounting flange 40.

Figure 9:
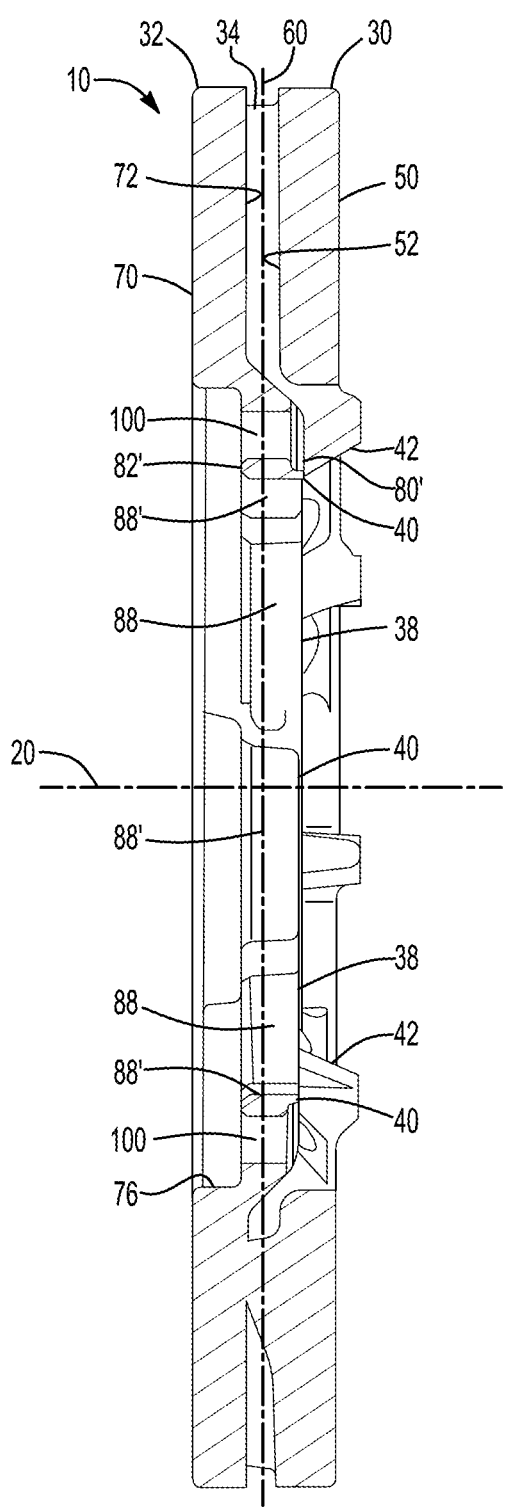
FIG. 9 is a section view of the brake rotor along section line 9-9.

Referring to FIGS. 2, 3 and 9, one or more mounting holes 100 may be provided with a mounting flange, such as a first mounting flange 38, a second mounting flange 40, or combinations thereof. A mounting hole 100 may facilitate mounting of the brake rotor 10 to the hub. For instance, a mounting hole 100 may receive a fastener, such as a bolt, that may couple the brake rotor 10 to the wheel hub. A mounting hole 100 may be configured as a through hole. The mounting holes 100 may be arranged around the axis 20 and may be disposed at a substantially constant distance from the axis 20 in one or more configurations. In the configuration shown, a pair of mounting holes 100 is provided with each first mounting flange 38 and with each second mounting flange 40; however, it is contemplated that a greater or lesser number of mounting holes may be provided with some or all mounting flanges. The mounting holes 100 are illustrated as being positioned on opposite sides of the reinforcement feature 42. As such, a reinforcement feature 42 may be disposed between adjacent mounting holes 100 in one or more configurations.

Referring to FIGS. 2, 4 and 6, one or more tone ring mounts 44 may be optionally provided. A tone ring mount 44 may facilitate mounting of a tone ring to the brake rotor 10. A tone ring may be configured as a ring that may extend continuously around the axis 20 and at least a portion of the rotor opening 36. The tone ring may be configured as an encoder disc that may have a plurality of encoder features, such as teeth, that may be arranged in a repeating pattern around the axis 20. A sensor may detect rotation of the tone ring and thereby detect rotation of the brake rotor 10 and a corresponding vehicle wheel in a manner known by those the skilled in the art. A tone ring mount 44 may have any suitable configuration. For instance, the tone ring mount 44 may include a fastener hole 110.

The fastener hole 110 may be configured to receive a fastener, such as a screw or bolt, that may fixedly couple the tone ring to the brake rotor 10. The fastener hole 110 may extend from an end surface 112 of the tone ring mount 44.

In at least one configuration, a tone ring mount 44 may extend from a reinforcement feature 42 in a direction that extends away from the center plane 60. For instance, a tone ring mount 44 may extend from a reinforcement feature 42 to an end surface 112. The end surface 112 may face away from the center plane 60. Optionally, the tone ring mount 44 and the end surface 112 may protrude in an axial direction past the friction surface of a panel, such as the first friction surface 50 or the second friction surface 70. For example, in FIG. 6 the tone ring mounts 44 protrude past the first panel 30 and the first friction surface 50 such that the end surface 112 may be axially positioned further away from the second panel 32 and the center plane 60 than the first panel 30. It is contemplated that a tone ring mount 44 may also be spaced apart from a reinforcement feature 42, may not be provided or associated with one or more mounting flanges, or combinations thereof.

Heating of a brake rotor may be caused by frictional engagement of brake pads with the friction surfaces of the brake rotor. Providing a brake rotor with first and second panels that are spaced apart from each other or separated by vanes may help improve dissipation of heat from the brake rotor. In addition, separating the first and second panels may help reduce the weight of the brake rotor and may permit additional heat dissipation from the region between the first and second panels.

Providing mounting flanges that extend from one panel, such as a first panel but not a second panel, that extend from one side of a brake rotor, that may be localized on one side of a center plane, or combinations thereof may contribute to temperature differences between the panels, which can lead to rotor coning issues, uneven brake pad wear, and increase thermal stress and potential thermal fractures. Providing mounting flanges that extend from each panel such that a mounting flange extends from one panel and is partially or completely separated from another panel of the brake rotor may improve heat dissipation from the brake rotor. For example, heat dissipation from the first panel and the second panel may be better balanced or more equally balanced by separating the mounting flanges associated with the first panel from the second panel and vice versa.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake rotor comprising:
a first panel that extends around an axis;
a second panel that is spaced apart from the first panel and extends around the axis, wherein the first panel and the second panel cooperate to at least partially define a rotor opening;
a first set of mounting flanges that extend from the first panel into the rotor opening and are spaced apart from the second panel;
a second set of mounting flanges that extend from the second panel into the rotor opening, wherein the second set of mounting flanges is spaced apart from the first set of mounting flanges; and a reinforcement feature that extends from the first panel to a member of the first set of mounting flanges, wherein the reinforcement feature is spaced apart from the second panel.

2. The brake rotor of claim 1 wherein each member of the second set of mounting flanges is spaced apart from the first panel.

3. The brake rotor of claim 1 further comprising a plurality of vanes that extend from the first panel to the second panel and are arranged around the first set of mounting flanges and the second set of mounting flanges, wherein the vanes are spaced apart from the first set of mounting flanges and the second set of mounting flanges.

4. The brake rotor of claim 1 wherein the first set of mounting flanges and the second set of mounting flanges are arranged in an alternating pattern around the axis.

5. The brake rotor of claim 4 wherein each member of the second set of mounting flanges is disposed between two different members of the first set of mounting flanges.

6. The brake rotor of claim 1 wherein a tone ring mount extends from the reinforcement feature.

7. The brake rotor of claim 1 wherein the reinforcement feature is disposed in the rotor opening and extends from the first panel toward the axis.

8. The brake rotor of claim 1 wherein the reinforcement feature is disposed between a pair of mounting holes that is provided with the member of the first set of mounting flanges.

9. The brake rotor of claim 1 wherein each member of the second set of mounting flanges has an inner flange side that faces toward the axis and an outer flange side that is disposed opposite the inner flange side, wherein the outer flange side extends from the second panel and is partially received inside a portion of the rotor opening defined by the first panel.

10. The brake rotor of claim 9 wherein the outer flange side is disposed in a nonparallel relationship with the inner flange side.

11. A brake rotor comprising:
a first panel that extends around an axis;
a second panel that is spaced apart from the first panel and extends around the axis, wherein the first panel and the second panel cooperate to at least partially define a rotor opening;
a first set of mounting flanges that extend from the first panel into the rotor opening and are spaced apart from the second panel; and
a second set of mounting flanges that extend from the second panel into the rotor opening, wherein the second set of mounting flanges is spaced apart from the first set of mounting flanges;
wherein each member of the first set of mounting flanges has an inner flange side that faces toward the axis and an outer flange side that is disposed opposite the inner flange side, wherein the outer flange side extends from the first panel and is partially received inside a portion of the rotor opening defined by the second panel.

12. The brake rotor of claim 11 wherein the outer flange side is disposed in a nonparallel relationship with the inner flange side.

13. The brake rotor of claim 11 wherein a reinforcement feature extends from the first panel to a member of the second set of mounting flanges, wherein the reinforcement feature is spaced apart from the second panel.

14. The brake rotor of claim 13 wherein the member of the second set of mounting flanges is spaced apart from the first panel.

15. The brake rotor of claim 13 wherein the reinforcement feature is disposed in the rotor opening and extends from the first panel toward the axis.

16. The brake rotor of claim 13 wherein the reinforcement feature is disposed between a pair of mounting holes that is provided with the member of the second set of mounting flanges.

17. The brake rotor of claim 13 wherein a tone ring mount extends from the reinforcement feature.

18. The brake rotor of claim 17 wherein the tone ring mount has an end surface that faces in an axial direction away from the second panel, wherein the tone ring mount protrudes past the first panel such that the end surface is axially positioned further away from the second panel than the first panel.

19. A brake rotor comprising:
a first panel that extends around an axis;
a second panel that is spaced apart from the first panel and extends around the axis, wherein the first panel and the second panel cooperate to at least partially define a rotor opening;
a first set of mounting flanges that extend from the first panel into the rotor opening and are spaced apart from the second panel;
a second set of mounting flanges that extend from the second panel into the rotor opening, wherein the second set of mounting flanges is spaced apart from the first set of mounting flanges;
a reinforcement feature that extends from the first panel to a member of the first set of mounting flanges; and
a tone ring mount that extends from the reinforcement feature.

20. The brake rotor of claim 19 wherein the tone ring mount has an end surface that faces in an axial direction away from the second panel, wherein the tone ring mount protrudes past the first panel such that the end surface is axially positioned further away from the second panel than the first panel.

* * * * *